US012738394B2

(12) United States Patent
Liu et al.

(10) Patent No.: US 12,738,394 B2
(45) Date of Patent: Sep. 15, 2026

(54) DATA AND POWER CABLES SUITABLE FOR IMMERSION COOLING

(71) Applicant: 3M INNOVATIVE PROPERTIES COMPANY, St. Paul, MN (US)

(72) Inventors: Richard Yufeng Liu, Woodbury, MN (US); John P. Baetzold, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 487 days.

(21) Appl. No.: 17/426,231

(22) PCT Filed: Jan. 29, 2020

(86) PCT No.: PCT/IB2020/050712

§ 371 (c)(1),
(2) Date: Jul. 28, 2021

(87) PCT Pub. No.: WO2020/161568

PCT Pub. Date: Aug. 13, 2020

(65) Prior Publication Data

US 2023/0368942 A1 Nov. 16, 2023

Related U.S. Application Data

(60) Provisional application No. 62/801,285, filed on Feb. 5, 2019.

(51) Int. Cl.
*H01B 7/28* (2006.01)
*H01B 7/285* (2006.01)
(Continued)

(52) U.S. Cl.
CPC ......... *H01B 7/285* (2013.01); *H01B 11/1895* (2013.01); *H01B 11/22* (2013.01)

(58) Field of Classification Search
CPC . H01B 7/02; H01B 7/28; H01B 7/285; H01B 11/18; H01B 11/1895; H01B 11/22;
(Continued)

(56) References Cited

U.S. PATENT DOCUMENTS 3,125,391 A * 3/1964 Hart .................. H01R 13/5219 439/282
4,107,451 A * 8/1978 Smith, Jr. ............ H02G 15/196 174/76
(Continued)

FOREIGN PATENT DOCUMENTS

CN 102751020 10/2012
CN 202917933 5/2013
(Continued)

OTHER PUBLICATIONS

Tuma, "Design Considerations Relating to Non-Thermal Aspects of Passive 2-Phase Immersion Cooling", 27th IEEE Semi-Therm Symposium, 2011, pp. 1-9.
(Continued)

*Primary Examiner* — William H. Mayo, III
(74) *Attorney, Agent, or Firm* — Jonathan L. Tolstedt

(57) ABSTRACT

A sealed cable assembly includes a jacket enclosing a plurality of insulated wires. Each insulated wire includes a bare wire covered by surrounding insulation, and a cable plug or connector is electrically connected with the bare wires. A sealant surrounds the insulated wires in an air gap between the jacket and the insulated wires in a location at or near the cable plug or connector, and the sealant fills the air gap at the location to prevent or reduce fluid loss through the cable in an immersion cooling system. The cable assembly can also be sealed at an in-between section away from the cable plug or connector. The cable assembly is wrapped with
(Continued)

a weatherproof film or tape at the location of the sealing to further prevent or reduce fluid loss through the cable.

17 Claims, 5 Drawing Sheets

(51) Int. Cl.
*H01B 11/18* (2006.01)
*H01B 11/22* (2006.01)

(58) Field of Classification Search
CPC ... H01R 4/02; H01R 4/18; H02G 1/10; H02G 1/12; H02G 1/1202; H02G 15/013; H02G 15/04; H02G 15/06; H02G 15/08; H02G 15/085; H02G 15/20; H02G 15/22; H02G 15/23
USPC ......... 174/74 R, 75 C, 76, 77 R, 84 R, 88 R, 174/88 C, 90, 93
See application file for complete search history.

(56) References Cited

U.S. PATENT DOCUMENTS 4,216,351 A * 8/1980 Brandeau ............ B29C 65/3468 174/92
4,704,498 A * 11/1987 Gregorac ................. H01R 9/05 174/79
4,719,315 A * 1/1988 Gregorac ................. H01R 9/05 174/79
4,915,990 A * 4/1990 Chang ....................... F16L 5/02 174/DIG. 8
5,070,597 A * 12/1991 Holt .......................... F16L 5/02 285/97
5,104,340 A * 4/1992 Elam .................... H01R 13/533 439/604
5,142,100 A * 8/1992 Vaupotic ............ H01B 11/1025 29/857
5,271,081 A * 12/1993 Khalil ................ G02B 6/44384 385/112
5,622,642 A * 4/1997 Edwards .............. H02G 15/043 24/114.5
5,762,135 A * 6/1998 Moore ................ E21B 33/0407 174/76
6,052,284 A 4/2000 Suga
6,940,712 B2 9/2005 Chu
7,254,024 B2 8/2007 Salmon
7,551,439 B2 6/2009 Peugh
8,619,425 B2 12/2013 Campbell
10,033,174 B2 * 7/2018 Emerson .................. H02G 3/22
2013/0102176 A1 4/2013 Kazubowski
2013/0129289 A1 * 5/2013 Roland .................. H01B 1/026 174/110 V
2014/0216711 A1 8/2014 Shelnutt
2017/0013744 A1 1/2017 Shelnutt
2018/0026433 A1 1/2018 Heise

FOREIGN PATENT DOCUMENTS

CN 204559302 U 8/2015
CN 105655017 6/2016
EP 0594793 5/1994

OTHER PUBLICATIONS

International Search Report for PCT International Application No. PCT/IB2020/050712, mailed on May 28, 2020, 3 pages.

* cited by examiner

DATA AND POWER CABLES SUITABLE FOR IMMERSION COOLING

CROSS REFERENCE TO RELATED APPLICATIONS

This application is a national stage filing under 35 U.S.C. 371 of PCT/IB2020/050712, filed Jan. 29, 2020, which claims the benefit of U.S. Provisional Application No. 62/801,285, filed Feb. 5, 2019, the disclosure of which is incorporated by reference in its/their entirety herein.

BACKGROUND

Data centers use immersion cooling tanks to provide for cooling and temperature control of electronic components. Data and power cables external to the tanks connect with the electronic components in the tanks, and the fluid used for immersion cooling can leak from the tanks through the cables. Since the fluid is an expensive component for the data centers, it is advantageous to minimize or reduce the loss of such fluid. Accordingly, a need exists for data and power cables better suited for immersion cooling.

SUMMARY

A sealed cable assembly includes a jacket enclosing a plurality of insulated wires and including an air gap between the jacket and the insulated wires. Each insulated wire includes a bare wire covered by surrounding insulation. A sealant surrounds the insulated wires in the air gap between the jacket and the insulated wires in a location along the jacket, and the sealant fills the air gap at the location.

Another sealed cable assembly includes a jacket enclosing a plurality of insulated wires and including an air gap between the jacket and the insulated wires. Each insulated wire includes a bare wire covered by surrounding insulation. A sealant surrounds the insulated wires in the air gap between the jacket and the insulated wires in a location at an in-between section of the jacket, and the sealant fills the air gap at the in-between section.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments include materials and design approaches which can prevent or reduce cooling fluids from leaving immersion cooling tanks via cables which are inside the tanks and exit the tanks to an external environment. Examples of cooling fluid include the NOVEC product and the FLUORINERT product, both from 3M Company.

Figure 1:
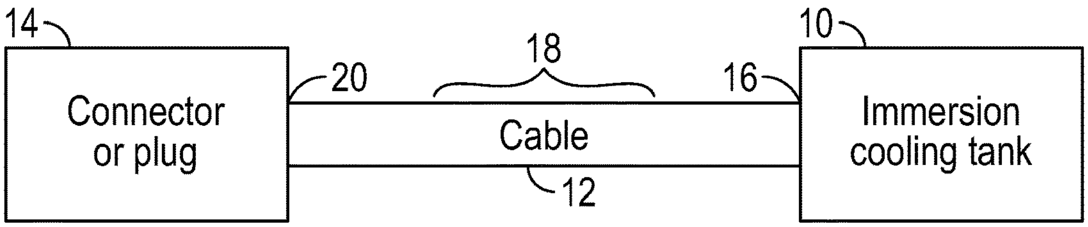
FIG. 1 is a block diagram illustrating a cable used with an immersion cooling tank.

FIG. 1 is a block diagram illustrating a cable 12 used with an immersion cooling tank or vessel 10. Tank 10 would contain electronic components in a data center, for example, with a cooling fluid in tank 10 used to cool or maintain temperature control of the electronic components. Cable 12 and other such cables are required to enter tank 10 at a hole or aperture 16 to provide power to the electronic components or provide for data transmission. Cable 12 includes a connector or plug 14 depending upon whether it is a power cable or a data cable. Cable 12 is mechanically coupled to tank 10 at aperture 16 and, since cable 12 enters tank 10, cable 12 is sealed to prevent or reduce the loss of fluid in tank 10 via cable 12. Cable 12 can be sealed in a location 20 at or near connector or plug 14, or sealed at an in-between section 18 in a location somewhere between the ends of cable 12, or sealed at both of these locations.

Figure 2A:
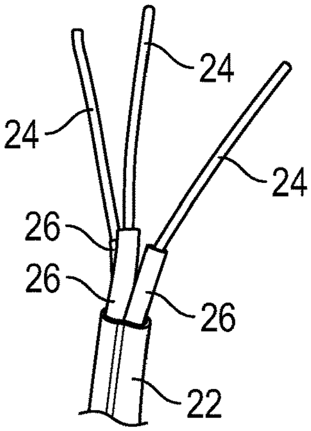
FIGS. 2A-2D illustrate a leak solution for sealing a power cable.
Figure 2B:
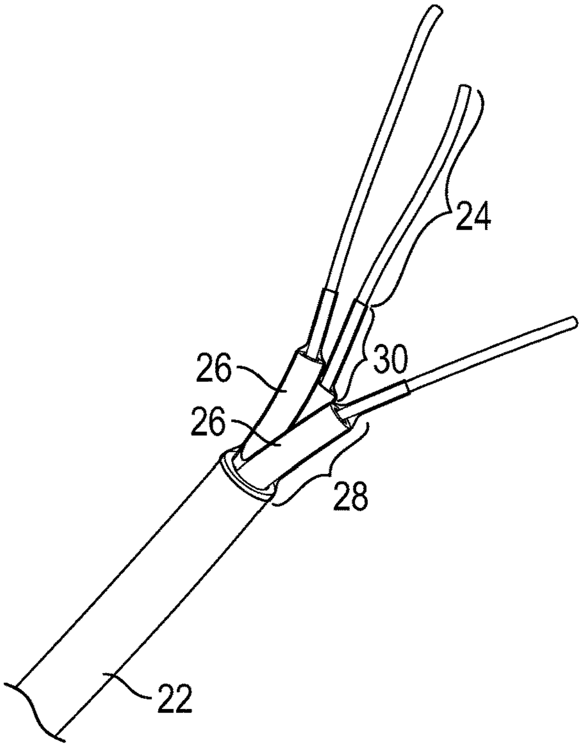

FIGS. 2A-2D illustrate a leak solution for sealing a power cable. As shown in FIG. 2A, the power cable includes bare wires 24 each encased within an insulation 26 and collectively encased within a jacket 22. This leak solution for a power cable includes the following steps.

Figure 2D:
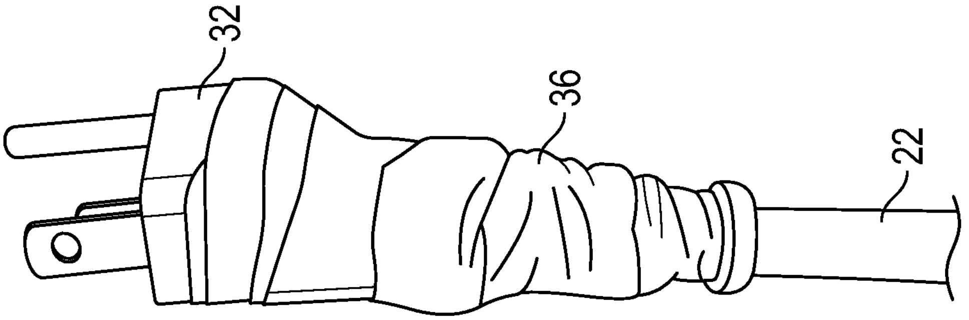
Figure 2C:
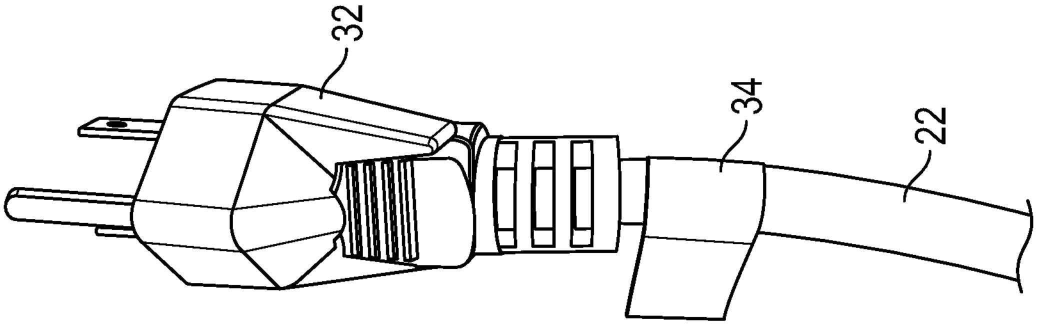

- Step 1—Strip insulation 26 to expose wires 24 (FIG. 2A).
- Step 2—Apply a liquid epoxy or other sealant to a jacket area 28 around the insulated wires and optionally around each individual wire insulation at an area 30 to fill air gaps and eliminate or reduce fluid leakage through the cable (FIG. 2B).
- Step 3—Before the epoxy from Step 2 is fully cured, electrically connect a power plug 32 to bare wires 24 and mechanically couple power plug 32 to jacket 22 in the final assembly, and optionally wrap the cable with additional weatherproof film or tape 34 at the location of mechanical coupling (FIG. 2C).
- Step 4—Optionally wrap the outer surface of the power cable at the plug, using a tape 36, to further eliminate or reduce fluid leakage through the cable (FIG. 2D).

These Steps 1-4 illustrated in FIGS. 2A-2D result in a cable assembly having a jacket enclosing a plurality of insulated wires with a sealant surrounding the insulated wires to fill and eliminate an air gap within the jacket around the wires in a location at or near the cable plug. The cable assembly optionally also includes a sealant surrounding a portion of each bare wire and overlapping with insulation where the bare wire is exposed to eliminate an air gap between the bare wire and the insulation surrounding the bare wire. A tape or film is wrapped around and surrounds the outer surface of the cable jacket in the location at or near the cable plug.

Figure 3A:
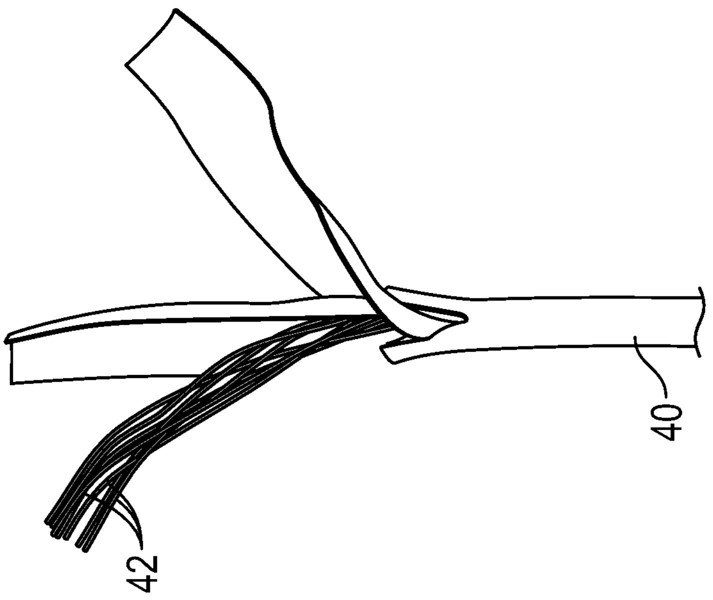
FIGS. 3A-3D illustrate a leak solution for sealing a data cable.
Figure 3B:
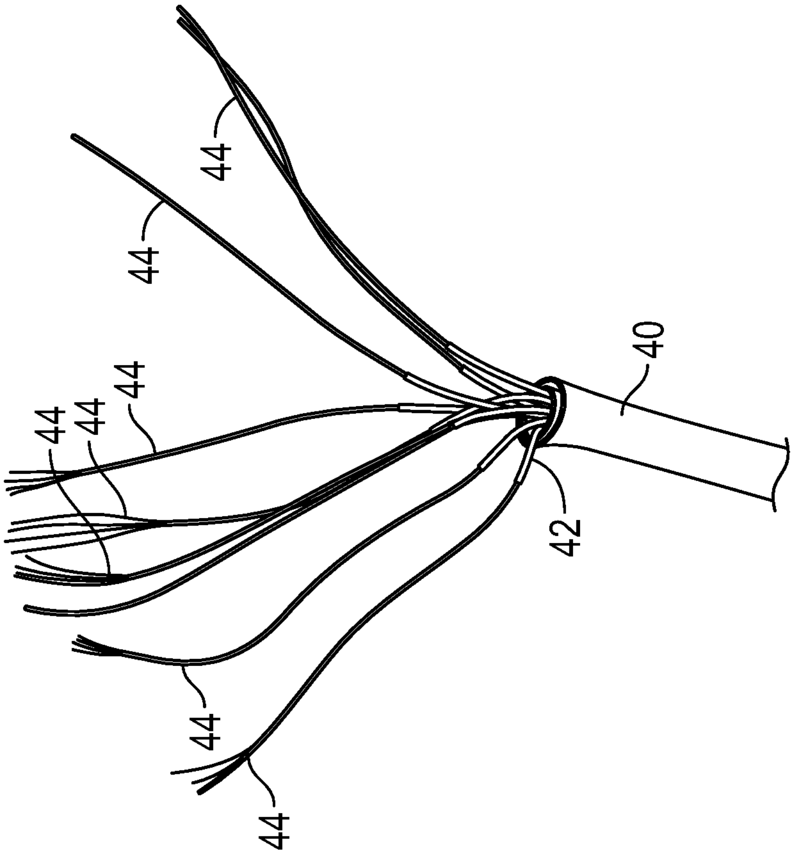

FIGS. 3A-3D illustrate a leak solution for sealing a data cable such as a coaxial cable or a fiber optical cable, or other data cables. As shown in FIGS. 3A and 3B, the data cable includes bare wires 44 each encased within an insulation 42 and collectively encased within a jacket 40. The bare wires 44 can be, for example, metal wires for a coaxial cable or fiber optical wires for a fiber optical cable. This leak solution for a data cable includes the following steps.

Figure 3D:
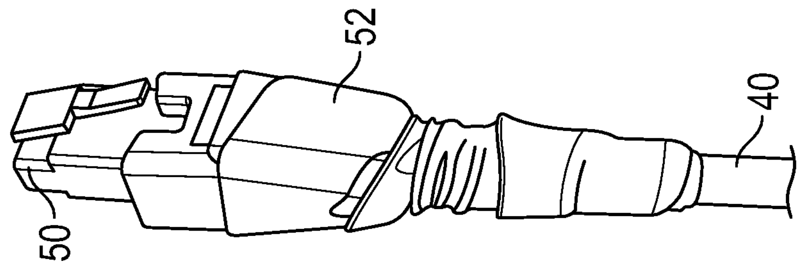
Figure 3C:
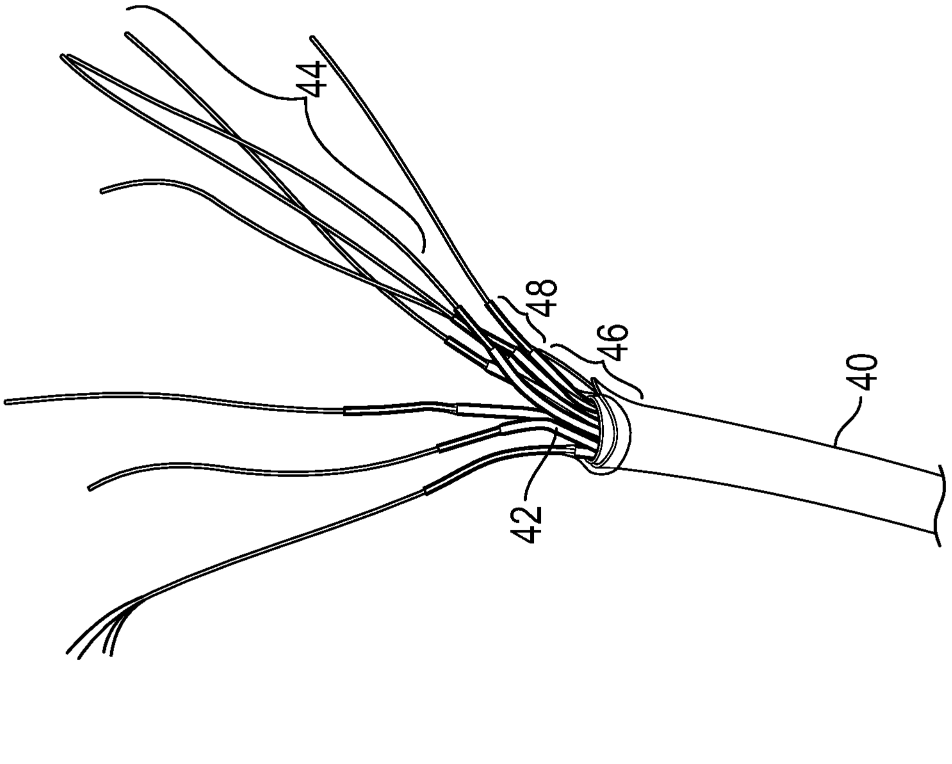

- Step 1—Cut open the cable to expose the insulated wires (FIG. 3A).
- Step 2—Strip insulation 42 to expose bare wires 44 (FIG. 3B).
- Step 3—Apply a liquid epoxy or other sealant to a jacket area 46 and optionally around each individual wire insulation at an area 48 to fill air gaps and eliminate or reduce fluid leakage through the cable (FIG. 3C).
- Step 4—Before the epoxy from Step 3 is fully cured, electrically connect a data link connector 50 to bare wires 44 and mechanically couple the data link connector 50 to jacket 40 in the final assembly, and optionally wrap the cable with additional weatherproof film or tape at the location of mechanical coupling (FIG. 3D).

These Steps 1-4 illustrated in FIGS. 3A-3D result in a cable assembly having a jacket enclosing a plurality of insulated wires with a sealant surrounding the insulated wires to fill and eliminate an air gap within the jacket around the wires in a location at or near the cable connector. The cable assembly optionally also includes a sealant surrounding a portion of each bare wire and overlapping with insulation where the bare wire is exposed to eliminate an air gap between the bare wire and the insulation surrounding the bare wire. Optionally, a tape or film is wrapped around and surrounds the outer surface of the cable jacket in the location at or near the cable connector.

FIGS. 4A-4D illustrate a leak solution for sealing an in-between section of a cable. This leak solution for an in-between section of a cable 60 (FIG. 4A) includes the following steps.

Figure 4A:
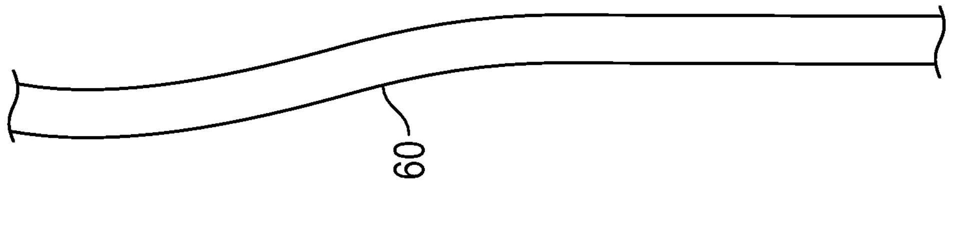
FIGS. 4A-4D illustrate a leak solution for sealing an in-between section of a cable.
Figure 4B:
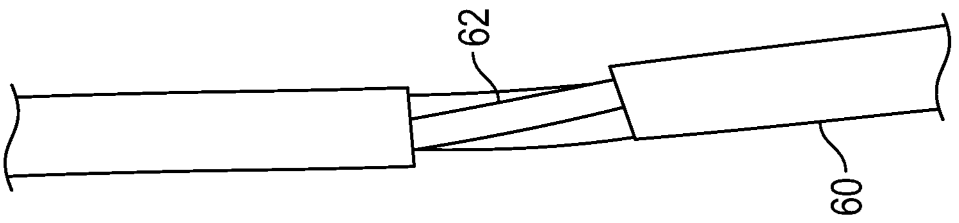

Step 1—Peel away the cable jacket or skin to expose insulated wires 62 (FIG. 4B).

Figure 4C:
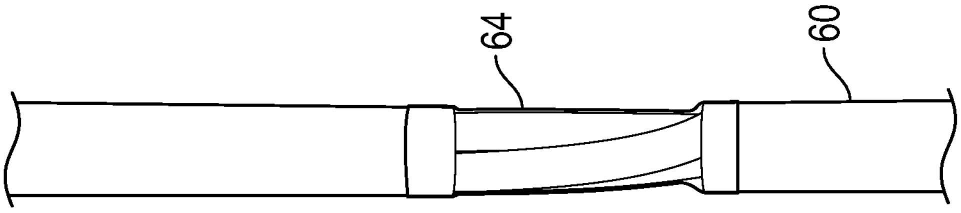

Step 2—Apply a liquid epoxy or other sealant 64 to insulated wires 62 and allow the epoxy or sealant to cure (FIG. 4C).

Figure 4D:
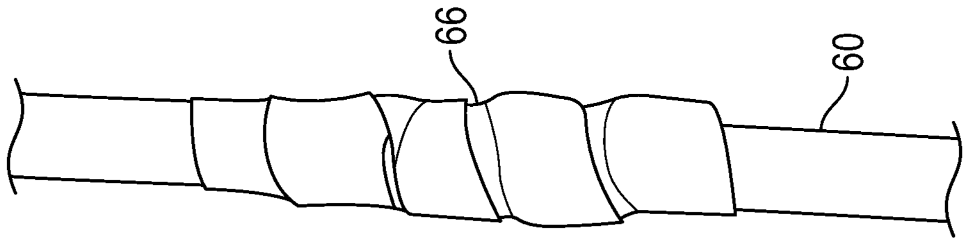

Step 3—Wrap the in-between section of the exposed insulated wires covered with the cured epoxy with a tape (FIG. 4D).

These Steps 1-3 illustrated in FIGS. 4A-4D result in a cable assembly having a jacket enclosing a plurality of insulated wires with a sealant surrounding the insulated wires to fill and eliminate an air gap within the jacket around the wires at an in-between section of the cable jacket. Optionally, a tape or film is wrapped around and surrounds the outer surface of the cable jacket at the in-between section.

Although the Steps illustrated in FIGS. 2A-2D, 3A-3D, and 4A-4D are shown as modifications to existing cables, these same or similar modification can be made to cables upon initial manufacture or assembly of them in order to seal the cables at or near connectors or plugs for the cables, or at an in-between section of the cables, or at both of these locations. The sealant in the modified cables fills and thus eliminates air gaps within the cable jackets and insulated wires in order to prevent or reduce fluid loss through the cables in immersion cooling systems. The sealants and tapes used for the modification are typically flexible and heat resistant such that the modified cables are still flexible and heat-resistant. Sealing the bare wires is optional in that the insulated wires are typically coated with the insulation, which can result in no air gap between the bare wire and the insulation surrounding the bare wire. Sealing the bare wires can provide another level of protection against loss of fluid as can sealing the cables in multiple locations.

The following are exemplary materials to seal cables using the Steps and assemblies described above.

Sealants include the following: 3M SCOTCH-WELD Structural DP100 Plus Epoxy Adhesive product (3M Company); SCOTCH Advanced Formula Super Glue product (3M Company); 3M Super Strength Adhesive product (3M Company); SCOTCH Maximum Strength Adhesive product (3M Company); and 3M SCOTCH-WELD EC 2216 Epoxy Adhesive product (3M Company). Other sealants that are flexible as cured, heat-resistant, and fluid-proof can also be used for the cable sealing. Other sealant chemistries that are also useful in this application include polyester, polyurethane, PVC, polyacrylates, polyamide, polyimide, or combination thereof. The curing process for the sealant could be selected from thermal curing, UV curing, electron beam curing, gamma radiation curing, moisture curing, or chemical curing.

Tapes or films include 3M Weatherproofing Film Wrap product (3M Company). Other tapes or films that are flexible, heat-resistant, and fluid-proof can also be used for the cable sealing. Such films or tapes can be selected from polyester film/tapes, polyurethane film/tapes, PVC film/tapes, acrylic film/tapes, or combination thereof.

EXAMPLES

Cables were sealed and tested by immersion in perfluorochemical fluid. Weight loss and extraction tests were performed. These Examples are merely for illustrative purposes only and are not meant to be limiting on the scope of the appended claims. All parts, percentages, ratios, etc. in the examples and the rest of the specification are by weight, unless noted otherwise. The following abbreviations are used herein: cm=centimeters; g=gram; ° C.=degrees centigrade; min=minute.

Materials

| Material | Abbreviation | Description |
|---|---|---|
| Perfluorochemical fluid | F1 | "3M FLUORINERT Electronic Liquid FC-40" obtained from 3M Company, St. Paul, MN |
| Perfluorochemical fluid | F2 | "3M Performance Fluid PF 5060" obtained from 3M Company |
| Bottle with Cap | | VWR Clear Wide Mouth Bottle with cap (4 ounce) Part # 10862-344 obtained from VWR International, Radnor, PA. |
| Power Cable - Consisting of an outer jacket which protects 3 wires with insulation around each wire | | Item# 1FD87B obtained from W.W. Grainger, Inc Lake Forest, IL |
| Epoxy Adhesive/Sealant | S1 | "3M SCOTCH-WELD Epoxy Adhesive DP100 Plus" obtained from 3M Company |
| Epoxy Adhesive/Sealant | S2 | "3M SCOTCH-WELD Epoxy Adhesive DP125 Gray obtained from 3M Company |

Test Methods

Extraction Test:

To determine the compatibility of the adhesives/sealants with perfluorochemical fluid, soxhlet extraction tests were run. The method as described in the publication "Design Considerations Relating to Non-Thermal Aspects of Passive 2-Phase Immersion Cooling", 27th IEEE SEMI-THERM Symposium, section 3.2 was used. The soxhlet extraction test was run with the perfluorinated fluid F2. The amount of adhesive/sealant extracted by the fluid=me % (percent extracted mass). The amount of fluid absorbed by the adhesive/sealant=ma % (percent mass adsorbed fluid). Results are shown in Table 1.

TABLE 1

Soxhlet Extraction Results for Adhesives/Sealants

| Adhesive/Sealant | Fluid | Tc (deg C.) | Time (hours) | me % | ma % |
|---|---|---|---|---|---|
| S1 | F2 | 56 | 67 | 0.26 | 0.1 |
| S2 | F2 | 56 | 48 | 0.15 | −0.2* |

*negative number = no fluid absorbed

Weight Loss Test/Example Preparation:

The power cable consisted of an outer jacket which surrounded 3 individual wires. The wires each had an insulation layer around them. The gap area was defined as the region between the outer cable surface and the insulation of the individual wires. The gap seal was defined as the sealant applied to the gap. The wire area was defined as the region between the individual wire insulation and the bare wire. The wire seal was defined as the sealant applied to the region between the bare wire and wire insulation.

Description of Preparation for Cable Leak Test—Gap Seal and Wire Seal:

A 15 cm long portion of the power cable was cut for each Example (both ends of the cable were cut with a wire cutter). At one end of the power cable, the outer jacket was removed with the wire cutter. This exposed about 2 cm of insulated individual wires. Then the same tool was used to remove the insulation on the 3 individual wires. This exposed about 1.5 cm of bare wire.

Examples (E1-E8)

In each Example, an adhesive/sealant was applied to either 1) the gap area to fill the region between the cable and wire insulation, or 2) both the gap area and the wire area. See Table 2 for the configurations tested. The sealed cables for each Example configuration were left to fully cure at room temperature for at least 180 minutes to achieve sufficient solidification.

To create an enclosed space for the weight loss testing, a bottle with cap was used. A drill press was used to create a hole (the same diameter as the power cable) in the center of the cap of the bottle. Two samples were made and tested for each Example configuration. The average of the two results are reported in the Table 2.

The bottle was first weighed by an analytical balance (wt1). Then about 90 g of F1 fluid was poured in the bottle and was weighed (wt2). After that, the sealed power cable for each Example configuration was put through the bottle opening, followed by applying the same adhesive/sealant to the inside of the cap thread and around the hole of the cap. Then quickly the cap was screwed on top of the bottle with F1 fluid inside to create an air tight seal. The exact depth of the power cable was adjusted to ensure that the end of the cable was 1 centimeter from the bottom of the bottle and fully submerged inside the liquid.

Examples configurations that were used in the Weight Loss Tests:

1) The sealed wire or gap area are outside of the bottle, i.e. labeled as "Gap and "Wire" area outside bottle" in Table 2.
2) The sealed wire or gap area are inside of the bottle, i.e. labeled as "Gap and Wire area inside bottle" in Table 2.

Then, the bottle was left for 24 hours at room temperature to fully cure.

After the sealant was fully cured, the whole assembly was weighed on an analytical balance (wt3). Then the whole assembly was put in an oven set at 50 C and removed at pre-determined time (T) to be weighed, (wt[T]). The following equations were used to determine weight loss:

wt4=wt2−wt1 Initial Weight of Fluorochemical:

Wt Loss % ($T$)=(wt[$T$]−wt3)/wt4×100%Weight Loss % at Time ($T$):

Comparative Example (CE1)

A Comparative Example was made and tested using the same protocols described above except that the jacket and wire were not removed, and no sealant was applied. The cap thread and the space between the cable and the cap around the drilled hole were sealed with sealant Si.

Results:

TABLE 2

| Example | Sealant/ Adhesive | Test Time (hours) | Seal Configuration: Gap Seal | Wire Seal | Gap and Wire area outside bottle | Gap and Wire area inside bottle | wt % Loss (24 hours) |
|---|---|---|---|---|---|---|---|
| CE1 | none | 24 | No | No | n/a | n/a | 12.5% |
| E1 | S1 | 24 | Yes | No | Yes | No | 9.2% |
| E2 | S1 | 24 | Yes | No | No | Yes | 8.3% |
| E3 | S1 | 24 | Yes | Yes | Yes | No | 0.0% |
| E4 | S1 | 24 | Yes | Yes | No | Yes | 0.6% |
| E5 | S2 | 24 | Yes | No | Yes | No | 8.6% |
| E6 | S2 | 24 | Yes | No | No | Yes | 7.6% |
| E7 | S2 | 24 | Yes | Yes | Yes | No | 1.4% |
| E8 | S2 | 24 | Yes | Yes | No | Yes | 0.9% |

The invention claimed is:

1. A sealed cable assembly, comprising:

a jacket enclosing a plurality of insulated wires and including an air gap between the jacket and the insulated wires, wherein the insulated wires each comprise a bare wire covered by a surrounding insulation; and a sealant surrounding the insulated wires in the air gap between the jacket and the insulated wires in a location along the jacket, and away from a terminating end of the sealed cable assembly, wherein the sealant fills the air gap at the location, but the air gap outside of the location is left unfilled;

wherein the sealed cable assembly has at least one plug or connector on at least one end of the sealed cable assembly connected to at least one of the bare wires, and wherein the sealant is present on at least one wire at a location near the plug or connector, but not within the plug or connector.

2. The cable assembly of claim 1, further comprising another sealant surrounding a portion of each bare wire and overlapping with the insulation where the bare wire is exposed.

3. The cable assembly of claim 2, wherein the another sealant comprises another epoxy.

4. The cable assembly of claim 1, further comprising a tape or film wrapped around and surrounding an outer surface of the jacket in the location at or near the plug or connector.

5. The cable assembly of claim 1, wherein the sealant comprises an epoxy.

6. The cable assembly of claim 1, wherein the sealant is a cured epoxy.

7. The cable assembly of claim 6, wherein the sealant comprises an epoxy-containing liquid.

8. The cable assembly of claim 1, wherein the cable assembly comprises a coaxial cable for data transmission.

9. The cable assembly of claim 1, wherein the cable assembly comprises a fiber optical cable for data transmission.

10. The cable assembly of claim 1, wherein the cable assembly comprises an electrical cable for power supply.

11. The cable assembly of claim 1, wherein the cable assembly is mechanically coupled with an immersion cooling tank at an aperture in the tank.

12. A sealed cable assembly, comprising:

a jacket enclosing a plurality of insulated wires and including an air gap between the jacket and the insulated wires, wherein the insulated wires each comprise a bare wire covered by a surrounding insulation; and a sealant surrounding the insulated wires in the air gap between the jacket and the insulated wires in a location at an in-between section of the jacket, and away from a terminating end of the sealed cable assembly, wherein the sealant fills the air gap at the in-between section, but the air gap outside of the location is left unfilled;

wherein the sealed cable assembly has at least one plug or connector on at least one end of the sealed cable assembly connected to at least one of the bare wires, and wherein the sealant is present on at least one wire at a location near the plug or connector, but not within the plug or connector.

13. The cable assembly of claim 12, further comprising a tape or film wrapped around and surrounding an outer surface of the jacket at the in-between section.

14. The cable assembly of claim 12, wherein the sealant comprises an epoxy.

15. The cable assembly of claim 12, wherein the cable assembly comprises a power cable.

16. The cable assembly of claim 12, wherein the cable assembly comprises a data cable.

17. The cable assembly of claim 12, wherein the cable assembly is mechanically coupled with an immersion cooling tank at an aperture in the tank.

* * * * *